(12) United States Patent
Stanfield

(10) Patent No.: US 6,353,195 B1
(45) Date of Patent: Mar. 5, 2002

(54) MECHANISM FOR INTERRUPTING CURRENT FLOW THROUGH TWO ELECTRICAL CABLES

(76) Inventor: Spencer G. Stanfield, 19540 Stratford, Detroit, MI (US) 48221

( * ) Notice: Subject to any disclaimer, the term of this patent is extended or adjusted under 35 U.S.C. 154(b) by 0 days.

(21) Appl. No.: 09/434,013
(22) Filed: Nov. 4, 1999
(51) Int. Cl.[7] .............................................. H01H 27/06
(52) U.S. Cl. .................................. 200/43.08; 200/153
(58) Field of Search ......................... 200/11 R–11 TW, 200/500–517, 555–273, 11 C, 43.08, 1 V, 504, 43.22, 50.09

(56) References Cited

U.S. PATENT DOCUMENTS 2,816,198 A  * 12/1957  Cherry
4,639,562 A  *  1/1987  Fredrickson ............. 200/43.08
5,086,200 A  *  2/1992  Kline et al. .................. 200/571
5,319,277 A  *  6/1994  Materne et al. ............. 310/239

* cited by examiner

Primary Examiner—P. Austin Bradley
Assistant Examiner—Nhung Nguyen
(74) Attorney, Agent, or Firm—Bill C. Panagos

(57) ABSTRACT

An electrical cable system can be modified to include a switch, so that signals traveling through the cable can be selectively interrupted. The switch can include threaded connectors for anchoring the switch to complementary threaded ends on the cable sections. Switch operation can be accomplished with a key-actuated lock mounted on the switch housing. The system is tamper resistant as its construction prevents access to the cable ends to bypass the system switch.

10 Claims, 1 Drawing Sheet

MECHANISM FOR INTERRUPTING CURRENT FLOW THROUGH TWO ELECTRICAL CABLES

BACKGROUND AND SUMMARY OF THE INVENTION

This invention relates to a user-installable device for allowing current flow through two connected electrical cables to be selectively interrupted by the cable user. The invention can be used, e.g. by the owner of a cable television set for the purpose of preventing unauthorized use of the television set. In one contemplated usage of the invention, a parent is enabled to prevent a child from viewing the television set during certain hours of the day or night, at the parent's discretion. The invention can also be used for selectively interrupting electrical power flow through a computer cable or a standard cable extending from a power source to an electrical appliance.

U.S. Pat. No. 5,731,763, issued to S. Herweck et al, discloses an access control system for a television receiver, wherein a switch in the power supply system is operated remotely by means of a wireless transmitter and wireless receiver. The present invention relates to a mechanism for selectively interrupting current flow through a cable system, wherein a control switch is operated between a circuit-closed condition and a circuit-open condition by means of a key-activated lock. The switch is operatively positioned within a housing that includes a receptacle and a removable cover; the lock has a latch means that prevents the cover from being removed when the switch is in the circuit-open position. This feature prevents an unauthorized person from opening the cover or otherwise tampering with the switch.

Specific features of the invention will be apparent from the attached drawings and description of an illustrative embodiment of the invention.

DESCRIPTION OF A PREFERRED EMBODIMENT OF THE INVENTION

Figure 1:
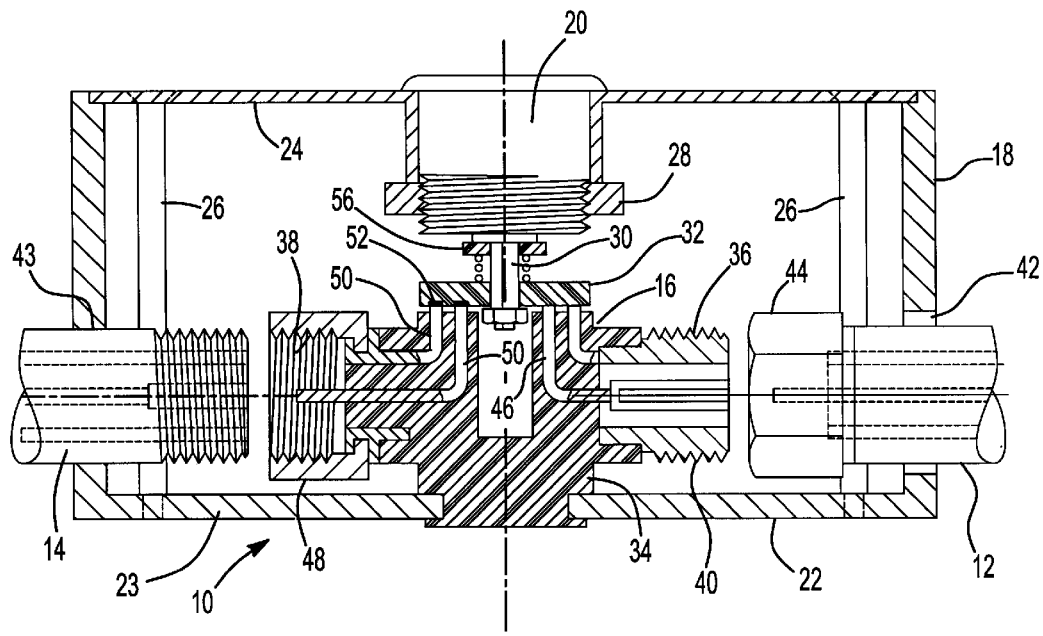
FIG. 1 is a sectional view through an illustrative embodiment of the invention, taken on line 1—1 in FIG. 2.
Figure 2:
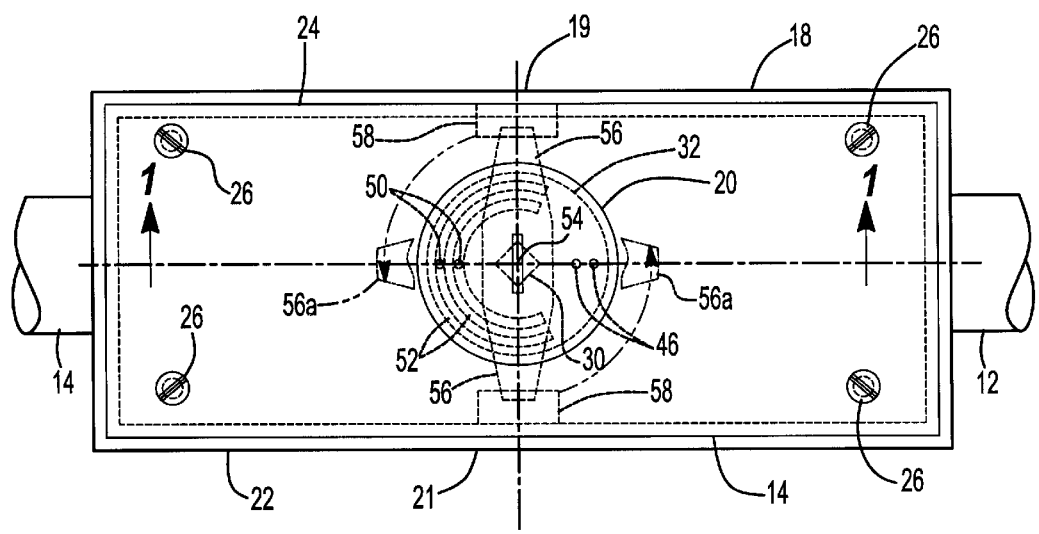
FIG. 2 is a top plan view of the structure depicted in FIG. 1.

As shown in FIGS. 1 and 2, the invention embodies a control mechanism 10 for selectively interrupting current flow through two electrical cables 12 and 14. Each cable may be a coaxial cable having an axial electrical conductor and an annular electrical conductor encircling the axial conductor, or an electric cable or even a telephone cable. However, for purposes of description only, a coaxial cable system will be described. The two cables are located between a cable input connection from a community antenna television system (CATV) and an individual television receiver (not shown). In the particular system shown in FIG. 1, the T.V. signal flows in a right-to-left direction from cable 12 into cable 14. The control system 10 includes a control selector switch 16 located within a housing 18 for selectively interrupting current flow from cable 12 to cable 14.

Switch 16 is operated by a key-actuated rotary lock 20 mounted on housing 18, such that the user has access to the lock, but not to the switch. The person can operate the switch only if he has the appropriate key for the lock. Housing 18 has an anti-tamper construction, such that the person is prevented from by passing the lock to directly access the switch. In one position of the lock the switch is in a circuit-closed condition, wherein electrical signals can pass from cable 12 through the switch to cable 14. In the other position of the lock the switch is in a circuit-open condition for interrupting current flow between cables 12 and 14. In another embodiment, it is contemplated that a three position switch is used. In one position, the latch means is open and the circuit is closed, in a second position the latch means is locked and the circuit is closed, and in a third position, the latch means is locked and the circuit is open. In all three positions, it is contemplated that the key is removable.

In still another embodiment, it is contemplated that an electronic, programmable lock could be used wherein the lock means is operated by means of a program. The form and program of such a mechanism would be apparent to one of ordinary skill in the art.

Housing 18 includes an open-topped receptacle 22 and a removable cover 24 secured to the receptacle by four screws 26. Each screw threads into a threaded hole in the bottom wall of the receptacle.

Lock 20 can be a conventional pin tumbler lock secured to cover 24 by a hidden (inaccessible) nut 28. The lock has a rotatable spindle 30 that carries a printed circuit board 32. Board 32 forms part of control switch 16.

Switch 16 includes a dielectric molded base 34 secured to the bottom wall 23 receptacle 22. Two threaded connectors 36 and 38 are incorporated into base 34 during the molding operation. Each threaded connector has an annular conductive component (an internally threaded connector) and an axial conductive component (an eternally threaded connector) for forming the necessary electrical connections with the conductors in cables 12 and 14. As shown in FIG. 1. Cables 12 and 14 are detached from associated threaded connectors 36 and 38.

Connector 36 has a stationary male threaded end 40 aligned with a circular hole 42 in the right end wall of receptacle 22. Cable 12 has a rotary coupling 44 that can be manually threaded onto end 40 of connector 36, to form the necessary electrical connections between the cable conductors and the conductive components in connector 36. Two pin-type electrical contacts 46 are incorporated into connector 36 to provide exposed contact elements engageable with the undersurface of the aforementioned circuit board 32.

Connector 38 includes a manually rotatable coupling 48 that is internally threaded, whereby the coupling can be manually threaded onto a male thread on the end of cable 14 (after cable 14 has been inserted through hole 43 in the left end of receptacle 22). Connector 38 includes two pin-type electrical contacts 50 that provide exposed contact elements aligned with the undersurface of circuit board 32.

The manual operations involved in connecting the co-axial cables 12 and 14 to the switch connectors 36 and 38 are performed with cover 24 removed from receptacle 22 (by unthreading screws 26 from the receptacle bottom wall).

As shown in FIG. 1, connector 36 has a male thread adapted to mate with a female thread on the end of cable 12; connector 38 has a female thread adapted to mate with a male thread on cable 14. The threads on the two connectors are complementary so that the overall cable system (comprised of cables 12 and 14) can have a male tread at one end and a female thread at the other end, thus making the cable system compatible with connections found on existing signal inputs and television receivers.

If so desired, connectors 36 and 38 could be provided with similar threaded ends (i.e., male threads or female threads). Preferably, each threaded connection includes a rotary threaded coupling, whereby the connection is an anchored connection resistant to pull-out of the cable through hole 42 or hole 43. Cables 12 and 14 may be conventional cables suited for the particular appliance or system being powered.

Printed circuit board 32 has two arcuate printed circuits (or tracks) 52 on its undersurface. As shown in FIG. 2, circuit tracks 52 are concentric around the central switch-lock axis 54, so that rotational motion of lock spindle 30 causes tracks 52 to traverse the exposed contact elements 46 and 50 that protrude from the upper surface of dielectric base 34.

Lock 20 is of conventional design, whereby manual turning of the key in the lock produces one quarter revolution of spindle 30 and circuit board 32. FIG. 2 shows circuit board 32 in one position wherein the two switch circuits are open, i.e, tracks 52 are out-of-contact with contact elements 46. When the key is turned in lock 20 circuit board 32 rotates one quarter revolution, such that tracks 52 bridge across contacts 50 and 46 to the circuit-closed condition. When the switch is not being operated the key is withdrawn from lock 20 to prevent unauthorized operation of the switch. It is also within the scope of this invention to employ an electronic programmable lock so that only a person with knowledge of the program can operate the lock.

As previously noted, cover 24 can be removed from receptacle 22 by unthreading screws 26 from the receptacle bottom wall. To prevent any unauthorized removal of the cover when the switch is in the circuit open condition (as shown in FIG. 2) the lock includes a second means for securing the cover to the receptacle. This second cover securement means includes a latch structure 56 suitable secured to lock spindle 30. Two abutment walls 58 extend from the side walls 19 and 21 of receptacle 22 in a plane slightly above the plane of latch structure 56, so that when circuit board 32 is in the FIG. 2 circuit open condition, cover 24 is secured to the receptacle (by the latch structure) even though screws 26 might be unthreaded (removed) from the receptacle. When the lock system is in the FIG. 2 condition it is impossible to remove cover 24, or otherwise gain access to switch 16 (for defeating the switch function).

When the lock is operated by the key to the circuit-closed condition, latch structure 56 is rotated one quarter revolution to the position designated by numeral 56a. In this position of the latch cover 24 can be removed from receptacle 22 (by unthreading screws 26). The manual operations of connecting cables 12 and 14 to switch 16 are performed with cover 24 removed from the receptacle.

The drawings show one form that the invention can take. It will be appreciated that the invention can be practiced in other forms and configurations. For example, the lock could be a combination lock, or an electronic programmable lock, rather than a key-actuated lock. The switch could include a rotary plug-type switching element instead of a circular circuit board. The cable connectors could take various forms, dependent on the cable design and switch design.

What is claimed:

1. A mechanism for selectively interrupting current flow through two electrical cables, comprising: a tamper resistant housing having an open topped receptacle having sidewalls; a bottom wall and a removable cover secured thereto by four screws; said sidewalls further equipped with abutment walls extending therefrom in a plane; said housing further having two aligned openings for receiving end portions of two electrical cables; a selector switch located within said housing between said aligned openings; and a rotary lock mounted on said housing for operating said selector switch between a first position wherein the electrical cables are in a circuit-closed condition and a second position wherein the electrical cables are in a circuit-open condition, said rotary lock having a rotatable spindle and including a latch structure secured to said spindle extending in a plane below the plane of the abutment walls, whereby when the switch is in the open position, the latch structure on the spindle engages the abutment walls on the receptacle sidewalls thereby locking the cover on the receptacle.

2. The mechanism of claim 1, wherein said selector switch comprises an externally threaded connector for attaching one cable to said switch and an internally threaded connector for attaching the other cable to said switch.

3. The mechanism of claim 2, wherein said internally threaded connector is manually rotatable.

4. The mechanism of claim 1, wherein said selector switch comprises a rotary printed circuit board connected to said lock, and contact means aligned with said circuit board, whereby circuit board rotation causes the printed circuit to engage or disengage said contact means.

5. The mechanism of claim 1, wherein said rotary lock is mounted on said cover, said selector switch comprising a stationary contact means positioned in said receptacle, and a printed circuit board connected to said rotary lock, whereby said rotary lock secures the housing together and causes the printed circuit board to engage or disengage said contact means.

6. The mechanism of claim 5, and further comprising means controlled by said rotary lock for preventing movement of said cover from its secured position on the receptacle.

7. The mechanism of claim 1, wherein said selector switch comprises a dielectric base, and two threaded connectors molded to said base for attaching two separate cables to the switch; one of said connectors being externally threaded, and the other connector being internally threaded; the threads on said connectors being complementary to accommodate similarly -constructed cables.

8. The mechanism of claim 7, wherein said internally threaded connector is manually rotatable.

9. The mechanism of claim 7, wherein said base has an exposed surface facing said lock; each said connector having two electrical contacts extending through said dielectric base so as to project out of said exposed surface; said switch comprising a printed circuit board connected to said lock in confronting relation to said electrical contacts, whereby operation of said lock causes the printed circuit board to engage or disengage said contacts.

10. The mechanism of claim 1, wherein said rotary lock is mounted on said cover; said selector switch comprising a dielectric base located within said receptacle, and two threaded connectors molded to said base for attaching two separate cables to the switch; each said connector having two stationary electrical contacts extending through said dielectric base so as to project out of said base; said lock having a rotary spindle; said selector switch comprising a printed circuit board attached to said spindle in confronting relation to said stationary electrical contacts, whereby operation of said lock causes the printed circuit board to engage or disengage said contacts; and means attached to the lock spindle for preventing movement of said cover from its secured position when the stationary electrical contacts are electrically disengaged.

* * * * *